(12) United States Patent
Dhanraj

(10) Patent No.: US 11,073,060 B2
(45) Date of Patent: Jul. 27, 2021

(54) METHOD FOR OPTIMIZING AN ACTIVE REGENERATION OF A DIESEL PARTICULATE FILTER

(71) Applicant: Robert Bosch GmbH, Stuttgart (DE)

(72) Inventor: Vijay Dhanraj, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 422 days.

(21) Appl. No.: 15/737,833

(22) PCT Filed: Jun. 1, 2016

(86) PCT No.: PCT/EP2016/062380
§ 371 (c)(1),
(2) Date: Dec. 19, 2017

(87) PCT Pub. No.: WO2017/005417
PCT Pub. Date: Jan. 12, 2017

(65) Prior Publication Data
US 2019/0003365 A1     Jan. 3, 2019

(30) Foreign Application Priority Data

Jul. 7, 2015 (DE) .......................... 102015212626.9

(51) Int. Cl.
*F01N 9/00* (2006.01)
*G01C 21/26* (2006.01)
(Continued)

(52) U.S. Cl.
CPC ........... *F01N 9/002* (2013.01); *B01D 46/006* (2013.01); *F02D 41/029* (2013.01);
(Continued)

(58) Field of Classification Search
CPC .. F01N 9/002; F01N 2900/12; F01N 2900/10; F01N 2900/0421; F01N 2900/08;
(Continued)

(56) References Cited

U.S. PATENT DOCUMENTS

2008/0295485 A1    12/2008  Wiley et al.
2011/0088374 A1*    4/2011  Johnson ................. F01N 9/002
                                                       60/285
(Continued)

FOREIGN PATENT DOCUMENTS

DE    102009036720 A1    2/2011
EP         2175110 A1    4/2010
(Continued)

OTHER PUBLICATIONS

International Search Report dated Sep. 13, 2016, of the corresponding International Application PCT/EP2016/062380 filed Jun. 1, 2016.

*Primary Examiner* — Peter D Nolan
*Assistant Examiner* — Ashley L Redhead, Jr.
(74) *Attorney, Agent, or Firm* — Norton Rose Fulbright US LLP; Gerard Messina

(57) ABSTRACT

A method for optimizing an active regeneration of a diesel particulate filter of a motor vehicle, including the following steps: First, information regarding the planned travel route of the motor vehicle is ascertained; subsequently, a query is made as to whether the remaining travel time is less than the time needed for an upcoming regeneration of the diesel particulate filter, and/or a query is made as to whether the following engine phase of the motor vehicle is an overrun phase; and the active regeneration of the diesel particulate filter is prevented, if the remaining travel time is less than the time needed for an upcoming regeneration of the diesel particulate filter, or if the following engine phase is an overrun phase.

14 Claims, 2 Drawing Sheets

(51) Int. Cl.
  *F02D 41/12*   (2006.01)
  *F02D 41/02*   (2006.01)
  *B01D 46/00*   (2006.01)
(52) U.S. Cl.
  CPC ........... *F02D 41/123* (2013.01); *G01C 21/26* (2013.01); *B01D 2279/30* (2013.01); *F01N 2900/0421* (2013.01); *F01N 2900/08* (2013.01); *F01N 2900/10* (2013.01); *F01N 2900/12* (2013.01); *F02D 2200/701* (2013.01); *Y02T 10/40* (2013.01)
(58) Field of Classification Search
  CPC ................. F02D 41/123; F02D 41/029; F02D 2200/701; B01D 46/006; B01D 2279/30; G01C 21/26; Y02T 10/47
  See application file for complete search history.

(56) References Cited

U.S. PATENT DOCUMENTS

2015/0113963 A1* 4/2015 Anilovich ................. F01N 3/10
                                                              60/286
2016/0201533 A1* 7/2016 Upadhyay ............... F01N 9/002
                                                              701/102

FOREIGN PATENT DOCUMENTS

FR           2936995  A3    4/2010
WO        2011020063  A2    2/2011

* cited by examiner

METHOD FOR OPTIMIZING AN ACTIVE REGENERATION OF A DIESEL PARTICULATE FILTER

FIELD

The present invention relates to a method for optimizing active regeneration of a diesel particulate filter of a motor vehicle. The present invention further relates to a computer program, which executes each step of the method of the present invention, when it runs on an arithmetic unit, as well as to a machine-readable storage medium, which stores the computer program. Finally, the present invention relates to an electronic control unit, which is configured to execute the method of the present invention.

BACKGROUND INFORMATION

Various components for re-treating exhaust gas, such as oxidation, SCR and $NO_x$ catalytic converters, as well as particulate filters, are used for complying with legal limiting values for emissions of internal combustion engines. Internal combustion engines, especially diesel engines, are frequently equipped with exhaust-gas aftertreatment systems, which may include, in particular, a particulate filter. During operation, this particulate filter becomes clogged with soot and must therefore be regenerated in specific intervals. Control and monitoring devices, in which the management for the particulate filter regeneration is implemented, are necessary for this. In this context, the functionality may be divided up into three basic functional blocks: estimating the loading of soot, which is stored in the particulate filter, controlling/monitoring the active regeneration, and coordinating the regeneration within the different operating phases of the internal combustion engine. The objective of the last functional block is to start the regeneration as rapidly as possible, when a particular value of the soot loading is reached or exceeded. However, this must take place under favorable operating conditions of the internal combustion engine. Regeneration under unfavorable operating conditions should be prevented. The above-described regeneration of a particulate filter with the aid of a control and monitoring device is referred to as active regeneration. In contrast to that, there is also so-called passive regeneration, which takes place during normal operating conditions of a motor vehicle, if the particulate filter is hot enough to combust the deposited particles. The temperature necessary for this is 550° C.

A method and a device for regenerating particulate filters in diesel engines are described in German Patent No. DE 101 61 461 B4. In this method, it is supposed to be ensured that the regeneration is only initiated above low fuel levels. In one specific embodiment of the above-described method, the particulate filter is regenerated, e.g., if the measured fuel level is between a first and a second threshold value and the measured loading of the particulate filter is between a first and a second loading level. In this manner, in the context of this method, the regeneration of a particulate filter for diesel exhaust gases does not occur, if the fuel supply of the engine has a relatively low fuel level. This prevents the vehicle from stalling due to a lack of fuel, since the fuel consumption would rise if the regeneration of the particulate filter were to be initiated.

SUMMARY

In accordance with the present invention, and example method for optimizing active regeneration, that is, regeneration of a diesel particulate filter of a motor vehicle, controlled by a control unit of the motor vehicle, includes a plurality of steps: First, information regarding the planned travel route of the motor vehicle is ascertained. Subsequently, a query is made regarding whether the remaining travel time is less than the time required for an upcoming regeneration of the diesel particulate filter, and/or a query is made regarding whether the following engine phase of the motor vehicle is an overrun phase. The active regeneration of the diesel particulate filter is prevented, if the remaining travel time is less than the time needed for an upcoming regeneration of the diesel particulate filter or the following engine phase is an overrun phase. The overrun phase is understood to be an operating state of the motor vehicle, in which no more gas is given, but the engine is still coupled. In this operating state, regeneration of the diesel particulate filter is unable to be carried out successfully, since due to the lack of injection in this operating state, a rich (fuel) mixture is not produced, and therefore, a temperature sufficiently high to regenerate the diesel particulate filter may not be reached. By preventing the active regeneration of the diesel particulate filter in the case, in which successful regeneration cannot be carried out, the wasting of fuel through an interruption of the regeneration of the diesel particulate filter is advantageously prevented. Successful regeneration is understood to mean that the regeneration of the diesel particulate filter is not aborted or interrupted prior to termination of the complete regeneration. In addition, rapid deterioration of the oil quality through the active regeneration of the diesel particulate filter is counteracted. At very high temperatures, the quality of the oil and, consequently, the lubricating properties of the oil, deteriorate.

According to a preferred specific embodiment of the present invention, active regeneration of the diesel particulate filter is initiated as soon as the active regeneration has been prevented more often than a specifiable number of times. In this manner, it is ensured that a necessary regeneration of the diesel particulate filter is also carried out, if the conditions of the travel route are not optimally suited for it, since, for example, the remaining travel time is too short or the following engine phase is an overrun phase.

The information about the planned travel route is preferably used, in order to determine sections along the planned travel route, which are suitable for carrying out regeneration of the diesel particulate filter successfully. This advantageous procedure allows that, if active regeneration of the diesel particulate filter must be prevented, the time or the section of the travel route, at or on which the regeneration may be carried out instead, may be determined in advance.

In one preferred specific embodiment of the present invention, the information about the planned travel route is ascertained from a navigation system of the motor vehicle. This is particularly advantageous, since in this manner, data already present in the navigation system may be used, and consequently, no additional source of information is necessary for the method.

According to a further preferred specific embodiment of the present invention, the information about the planned travel route is ascertained from a cloud. An advantage of this procedure is that in the cloud, more information regarding the planned travel route, which may be used by the control unit, is available, such as speed restrictions, course of the travel route, different sections of the travel route (city ride, overland ride, expressway ride), as well as sections where one must accelerate or decelerate, and information regarding temperature and weather effects.

The information about the planned travel route includes, in particular, one or more of the following: travel time, travel route, average speed of the motor vehicle, average engine speed, engine load, mass flow rate of exhaust gas, temperature profile of exhaust gas, approximate soot loading based on the route traveled and average fuel consumption. The use of this information is highly advantageous, since with the aid of this information, the time of the planned route may be determined, at which the exhaust-gas temperature, the mass flow rate of exhaust gas, the engine speed, as well as the engine load and the time required for regenerating the diesel particulate filter, are suitable for regenerating the diesel particulate filter.

The present invention further includes a computer program, which is configured to carry out each step of the method of the present invention, in particular, when it is executed on an arithmetic unit or electronic control unit. It allows the method of the present invention to be implemented on an electronic control unit, without having to make structural changes to it.

The present invention also includes a machine-readable storage medium, on which the computer program is stored, as well as an electronic control unit, which is configured to implement the method of the present invention.

Further advantages and features of the present invention are shown in the description below of exemplary embodiments in conjunction with the figures. In this connection, the individual features may each be implemented alone or in combination with one another.

DETAILED DESCRIPTION OF EXAMPLE EMBODIMENTS

Figure 1:
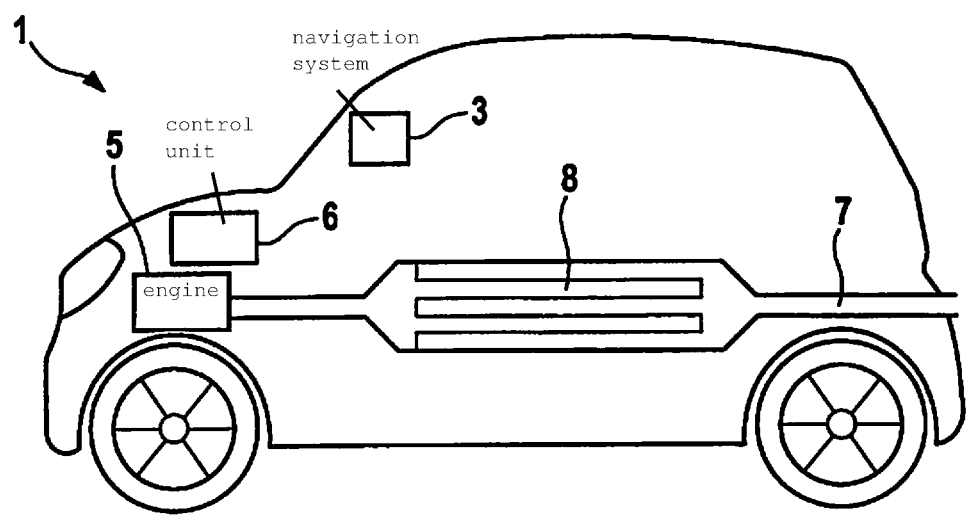
FIG. 1 shows a motor vehicle having a diesel particulate filter.

A motor vehicle 1 including a navigation system 3, an engine 5, a control unit 6, and an exhaust system 7 having a diesel particulate filter 8, is schematically represented in FIG. 1.

Figure 2:
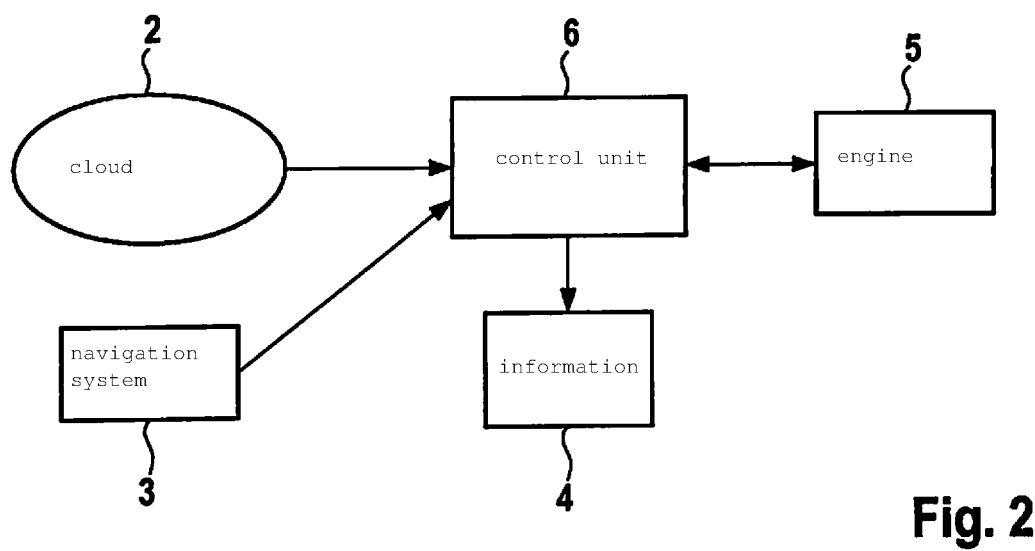
FIG. 2 shows a use of information regarding a planned travel route, for controlling a regeneration of the diesel particulate filter of the motor vehicle.

Control unit 6 and navigation system 3 of the motor vehicle 1 shown in FIG. 1, a cloud 2, a set of information 4 regarding a planned travel route of motor vehicle 1, as well as an engine 5 of motor vehicle 1, are schematically represented in FIG. 2.

Figure 3:
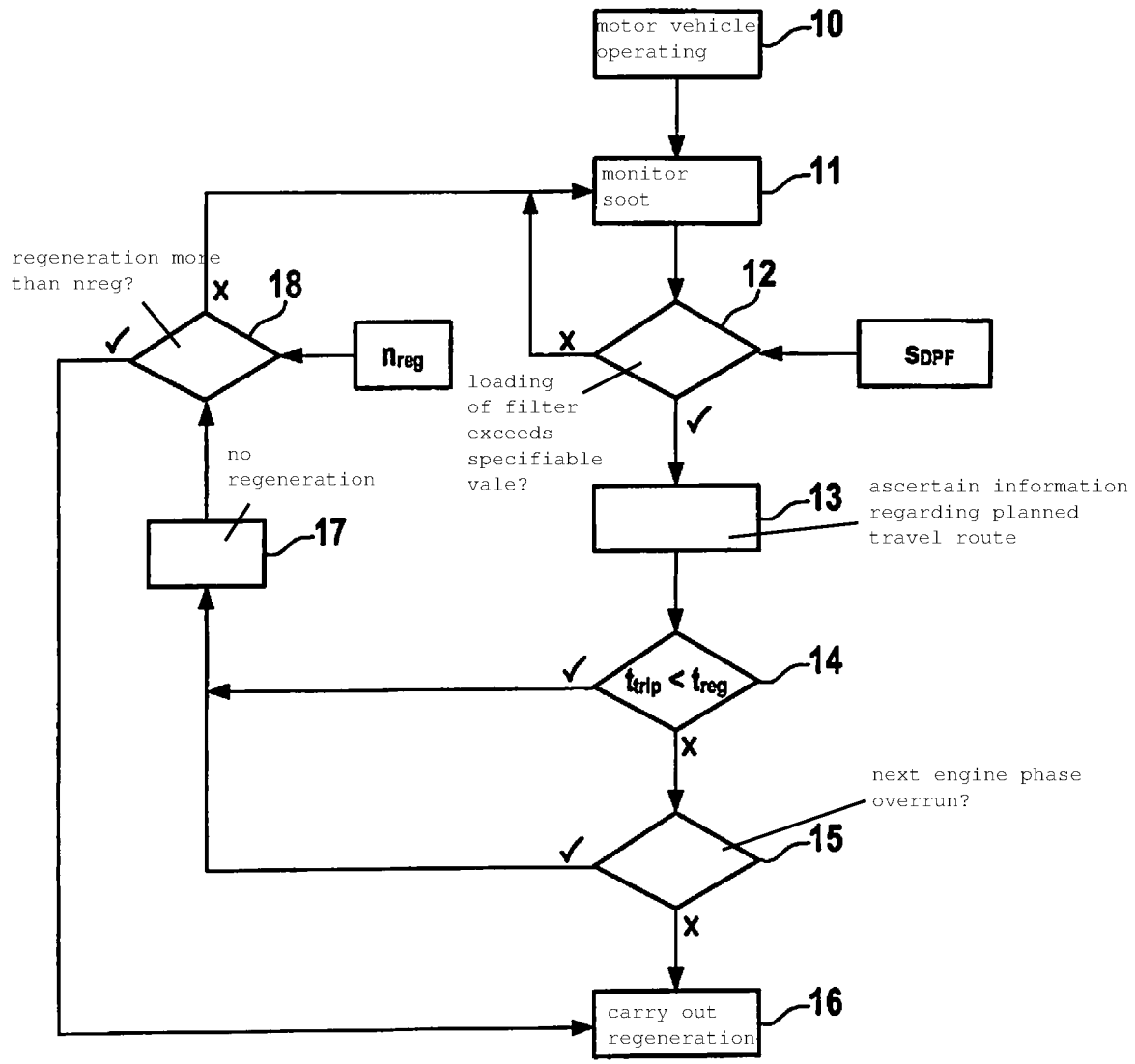
FIG. 3 shows the sequence of the method of the present invention, according to a first specific embodiment of the present invention.

The sequence of an exemplary embodiment of the method according to the present invention is schematically represented in FIG. 3. In first step 10 of the method, motor vehicle 1 is operating. In second step 11, the soot input into diesel particulate filter 8 of motor vehicle 1 is monitored. In the following step 12, a query is made as to whether the loading of diesel particulate filter 8 exceeds a specifiable value $s_{DPF}$. In this context, the loading of diesel particulate filter 8 is determined, first of all, by calculating the flow resistance of filter 8 from the pressure drop across filter 8 and the volumetric flow rate, the flow resistance being a measure of the permeability of filter 8. Secondly, the mass of soot deposited in particulate filter 8, the soot input, is calculated on the basis of a model. In the case described here, the value $s_{DPF}=40\%$; thus, in step 12, a query is made as to whether diesel particulate filter 8 has a loading of more than 40%. The set of information 4 regarding a planned travel route of motor vehicle 1 is ascertained in step 13 of the method. The information includes: travel time, travel route, average speed of motor vehicle 1, average engine speed, engine load, mass flow rate of exhaust gas, temperature profile of exhaust gas, approximate soot loading based on the route traveled and average fuel consumption. In this context, in one exemplary embodiment of the present invention, information 4 is ascertained in a navigation system 3 of motor vehicle 1. The ascertained information about the planned travel route is used, in order to determine sections along the planned travel route, which are long enough, and in which the engine is not in an overrun phase, in order to carry out a regeneration of diesel particulate filter 8 successfully. In this context, successful regeneration is understood to mean that the regeneration of diesel particulate filter 8 is not aborted or interrupted prior to termination of the complete regeneration.

Next, in step 14 of the method, a query is made as to whether remaining travel time $t_{trip}$ is less than the time $t_{reg}$ needed for an upcoming regeneration of diesel particulate filter 8. If this is the case, then regeneration of diesel particulate filter 8 is not initiated, which corresponds to step 17, and in the following step 18, the method tallies, how often a regeneration of diesel particulate filter 8 has already been prevented in succession. Subsequently, in step 18 as well, a query is made as to whether the regeneration of diesel particulate filter 8 has already been prevented more often than a specifiable number of times $n_{reg}$. In the present case, specifiable number $n_{reg}=2$, but this may also be any specifiable number. If number $n_{reg}$ is not exceeded in step 18, then the method is executed anew, beginning at step 11, that is, the monitoring of the soot input. If number $n_{reg}$ is exceeded in step 18, then step 16 of the method is executed, and the regeneration of diesel particulate filter 8 is carried out.

If, in step 14, remaining travel time $t_{trip}$ is not less than the time $t_{reg}$ needed for an upcoming regeneration of diesel particulate filter 8, then, in subsequent step 15, a query is made as to whether the next engine phase is an overrun phase. If this is the case, then regeneration of diesel particulate filter 8 is not carried out, which corresponds to step 17, and in the following step 18, the method tallies, how often the regeneration of diesel particulate filter 8 has already been prevented in succession. In this step, a query is subsequently made as to whether the regeneration of diesel particulate filter 8 has already been prevented more often than $n_{reg}=2$ times. If this is the case, then the regeneration of diesel particulate filter 8 is carried out in step 16 of the method. If number $n_{reg}=2$ times is not exceeded in step 18, then the method is run through again, from step 11, the monitoring of the soot input into diesel particulate filter 8.

If, in step 15, the following engine phase is not an overrun phase, then immediately, step 16 of the method is executed, and the regeneration of diesel particulate filter 8 is carried out.

According to a further exemplary embodiment of the present invention, in step 13 of the method, information 4 is ascertained in a cloud 2.

According to further exemplary embodiments of the present invention, only one of the two queries, that is, either step 14 or step 15 of the method, may also be executed.

What is claimed is:

1. A method for optimizing an active regeneration of a diesel particulate filter of a motor vehicle, comprising:
   a. ascertaining information regarding a planned travel route of the motor vehicle;

b. determining, based on the ascertained information regarding the planned route, whether a remaining travel time is less than a time needed for an upcoming regeneration of the diesel particulate filter, the remaining travel time being an amount of time remaining for the motor vehicle to complete the planned travel route; and c. based on the determining, preventing initiation of the active regeneration of the diesel particulate filter when the remaining travel time is less than the time needed for the upcoming regeneration of the diesel particulate filter;

wherein the active regeneration of the diesel particulate filter is initiated, as soon as the active regeneration has been prevented more often than a specifiable number of times.

2. The method as recited in claim 1, wherein the ascertained information regarding the planned travel route is used to determine sections along the planned travel route which are suitable for carrying out the upcoming regeneration of the diesel particulate filter successfully.

3. The method as recited in claim 1, wherein the ascertained information regarding the planned travel route is ascertained from a navigation system of the motor vehicle.

4. The method as recited in claim 1, wherein the ascertained information regarding the planned travel route is ascertained from a cloud.

5. The method as recited in claim 1, wherein the ascertained information regarding the planned travel route includes at least one of the following: travel time, travel route, average speed of the motor vehicle, average engine speed, engine load, mass flow rate of exhaust gas, temperature profile of exhaust gas, approximate soot loading based on the route traveled and average fuel consumption.

6. The method as recited in claim 1, further comprising the following steps:

determining whether a following engine phase of the motor vehicle is an overrun phase; and preventing the initiation of the active regeneration of the diesel particular filter when the following engine phase is the overrun phase;

wherein the overrun phase is a phase of an engine of the motor vehicle in which no more gas is given to the engine but the engine is still coupled.

7. The method as recited in claim 6, wherein the active regeneration of the diesel particulate filter is initiated as soon as the active regeneration has been prevented, more often than a specified number of times, based on the determining that the remaining travel time is less than the time needed for the upcoming regeneration of the diesel particulate filter and/or based on the determining that the following engine phase of the motor vehicle is the overrun phase.

8. The method as recited in claim 1, wherein the active regeneration of the diesel particulate filter is initiated as soon as the active regeneration has been prevented, more often than a specified number of times, based on the determining that the remaining travel time is less than the time needed for the upcoming regeneration of the diesel particulate filter.

9. A non-transitory machine-readable storage medium on which is stored a computer program for optimizing an active regeneration of a diesel particulate filter of a motor vehicle, the computer program, when executed by a computer, causing the computer to perform:

a. ascertaining information regarding a planned travel route of the motor vehicle;

b. determining, based on the ascertained information regarding the planned route, whether a remaining travel time is less than a time needed for an upcoming regeneration of the diesel particulate filter, the remaining travel time being an amount of time remaining for the motor vehicle to complete the planned travel route; and c. based on the determining, preventing initiation of the active regeneration of the diesel particulate filter when the remaining travel time is less than the time needed for the upcoming regeneration of the diesel particulate filter;

wherein the active regeneration of the diesel particulate filter is initiated, as soon as the active regeneration has been prevented more often than a specifiable number of times.

10. The non-transitory machine-readable storage medium as recited in claim 9, wherein the computer program, when executed by the computer, causing the computer to perform:

determining whether a following engine phase of the motor vehicle is an overrun phase; and preventing the initiation of the active regeneration of the diesel particular filter when the following engine phase is the overrun phase;

wherein the overrun phase is a phase of an engine of the motor vehicle in which no more gas is given to the engine but the engine is still coupled.

11. An electronic control unit, configured to optimize an active regeneration of a diesel particulate filter of a motor vehicle, the electronic control unit configured to:

a. ascertain information regarding a planned travel route of the motor vehicle;

b. determine, based on the ascertained information regarding the planned route, whether a remaining travel time is less than a time needed for an upcoming regeneration of the diesel particulate filter, the remaining travel time being an amount of time for the motor vehicle to complete the planned travel route; and c. based on the determination, prevent initiation of the active regeneration of the diesel particulate filter when the remaining travel time is less than the time needed for the upcoming regeneration of the diesel particulate filter;

wherein the active regeneration of the diesel particulate filter is initiated, as soon as the active regeneration has been prevented more often than a specifiable number of times.

12. The electronic control unit as recited in claim 11, wherein the electronic control unit is further configured to:

determine whether a following engine phase of the motor vehicle is an overrun phase; and prevent the initiation of the active regeneration of the diesel particular filter when the following engine phase is the overrun phase;

wherein the overrun phase is a phase of an engine of the motor vehicle in which no more gas is given to the engine but the engine is still coupled.

13. A method for optimizing an active regeneration of a diesel particulate filter of a motor vehicle, comprising:

a. ascertaining information regarding a planned travel route of the motor vehicle;

b. determining whether a following engine phase of the motor vehicle is an overrun phase; and c. based on the determining, preventing initiation of the active regeneration of the diesel particulate filter when the following engine phase is the overrun phase;

wherein the overrun phase is a phase of an engine of the motor vehicle in which no more gas is given to the engine but the engine is still coupled.

14. The method as recited in claim 13, wherein the active regeneration of the diesel particulate filter is initiated as soon as the active regeneration has been prevented, more often than a specified number of times, based on the determining that the following engine phase of the motor vehicle is the overrun phase.

* * * * *